(12) United States Patent
Wang et al.

(10) Patent No.: US 7,353,043 B2
(45) Date of Patent: Apr. 1, 2008

(54) MOBILE COMMUNICATION PERIPHERAL DEVICE

(75) Inventors: Jong-Ding Wang, Taipei (TW); Meng-Stephen Su, Taipei (TW); Wai-Yuen Tong, Taipei (TW)

(73) Assignee: Primax Electronics Ltd., Taipei (TW)

( * ) Notice: Subject to any disclaimer, the term of this patent is extended or adjusted under 35 U.S.C. 154(b) by 385 days.

(21) Appl. No.: 11/117,358

(22) Filed: Apr. 29, 2005

(65) Prior Publication Data

US 2006/0172771 A1 Aug. 3, 2006

(30) Foreign Application Priority Data

Mar. 2, 2005 (TW) .............................. 94106217 A

(51) Int. Cl.
*H04B 1/38* (2006.01)
(52) U.S. Cl. .................. 455/557; 455/567; 455/569.1; 345/156
(58) Field of Classification Search ............... 455/557, 455/567, 569.1, 41.2, 67.7, 575.1, 575.8, 455/90.3, 128; 345/156
See application file for complete search history.

(56) References Cited

U.S. PATENT DOCUMENTS

| | | | | |
|---|---|---|---|---|
| 5,652,499 A * | 7/1997 | Morita et al. | ............... | 320/112 |
| 5,677,948 A | 10/1997 | Meister | ............... | 379/142 |
| 5,724,667 A * | 3/1998 | Furuno | ............... | 455/575.2 |
| 5,740,624 A * | 4/1998 | Baseley | ............... | 40/649 |
| 5,881,149 A | 3/1999 | Weatherill | ............... | 379/433 |
| 6,311,071 B1 | 10/2001 | Voroba | ............... | 455/550 |
| 6,441,589 B1 * | 8/2002 | Frerking et al. | ............... | 320/162 |
| 6,473,628 B1 * | 10/2002 | Kuno et al. | ............... | 455/566 |
| 6,721,579 B2 * | 4/2004 | Liu | ............... | 455/569.1 |
| 6,892,083 B2 * | 5/2005 | Shostak | ............... | 455/575.6 |
| 2002/0090099 A1 | 7/2002 | Hwang | ............... | 381/312 |
| 2004/0204160 A1 | 10/2004 | Zoraku et al. | ............... | 455/569.1 |
| 2005/0124385 A1 * | 6/2005 | Toupin | ............... | 455/557 |
| 2006/0087493 A1 * | 4/2006 | Yeh | ............... | 345/156 |
| 2006/0113345 A1 * | 6/2006 | Zoullas et al. | ............... | 224/600 |

FOREIGN PATENT DOCUMENTS

| | | |
|---|---|---|
| DE | 200 08 751 U1 | 5/2000 |
| EP | 1 211 872 | 11/2001 |
| GB | 2 374 752 | 1/2001 |
| GB | 2400773 A * | 10/2004 |
| KR | 1020030025441 A | 3/2003 |
| WO | WO 02/060079 | 8/2002 |
| WO | WO 03/021990 | 3/2003 |
| WO | WO 03/039114 A1 | 5/2003 |
| WO | WO 03/084192 A1 | 9/2003 |

* cited by examiner

*Primary Examiner*—Matthew Anderson
*Assistant Examiner*—Minh Dao
(74) *Attorney, Agent, or Firm*—Troxell Law Office, PLLC

(57) ABSTRACT

A mobile communication peripheral device includes a main body, a circuit board, an earphone and a microphone. An identification card is disposed on a surface of the main body. The circuit board is disposed within the main body, and includes a transceiver for receiving and emitting a wireless communication signal and a signal processing device electrically to the transceiver for processing the wireless communication signal. The wireless communication signal includes a first audio signal. The earphone is coupled to the main body via a connecting wire for receiving and sending out the first audio signal. The microphone is coupled to the main body via the connecting wire for receiving a second audio signal.

5 Claims, 4 Drawing Sheets

MOBILE COMMUNICATION PERIPHERAL DEVICE

FIELD OF THE INVENTION

The present invention relates to a mobile communication peripheral device, and more particularly to a mobile communication peripheral device with dual functions of a badge card and a wireless earphone to be in communication with a mobile phone.

BACKGROUND OF THE INVENTION

In modern society, mobile phones become essential communication devices because they are portable. In some circumstances, however, the mobile phone is not suitable to be hand-held. For example, in the case of driving while using the mobile phone, the likelihood of the traffic accident is increased because only one hand is available for driving. In addition, the user may feel tired and inconvenient in a case of using the hand-held mobile phone for a long time period.

For a purpose of increasing convenience of using mobile phones, many mobile phone accessories such as mobile phone earphone devices, hands-free headsets and the like were developed.

The conventional mobile phone earphone device comprises an earphone and a microphone. The earphone device is plugged in a signal receiving socket of a mobile phone via a wire. When answering a call, the user can hear the caller via the earphone and dialogize with the caller via the microphone.

Although this wired earphone device is applicable when the mobile phone is not suitable to be hand-held, the wire connection between the earphone device and the mobile phone limits the mobility of the user.

In order to expand flexibility of using the hands-free mobile phone and avoid inconvenience of wire linkage, a bluetooth earphone was developed. As known, the bluetooth technology is a wireless transmission technology generally used in localized area, and will not be described in detail herein. The bluetooth earphone has therein a signal processing circuit, which cooperates with a mobile phone having a bluetooth chip to answer calls via the earphone device without the requirement of an electrical cable between the earphone and the mobile phone.

Such a wireless earphone device is not satisfactory because the user usually feels uncomfortable when a weighty or bulky wireless earphone is worn on the user's ear. In particular, it is inconvenient for the user who wears glasses to wear the wireless earphone because the glasses frame may interfere with the wireless earphone.

Accordingly, the above-described prior art method is not a perfect design and has still many disadvantages to be solved.

SUMMARY OF THE INVENTION

It is an object of the present invention to provide a mobile communication peripheral device with dual functions of a badge and a wireless earphone.

In accordance with an aspect of the present invention, there is provided a mobile communication peripheral device. The mobile communication peripheral device comprises a main body, a circuit board, an earphone and a microphone. An identification card is disposed on a surface of the main body. The circuit board is disposed within the main body, and comprises a transceiver for receiving and emitting a wireless communication signal and a signal processing device electrically connected to the transceiver for processing the wireless communication signal. The wireless communication signal includes a first audio signal. The earphone is coupled to the main body via a connecting wire for receiving and sending out the first audio signal. The microphone is coupled to the main body via the connecting wire for receiving a second audio signal.

In an embodiment, the main body comprises a rectangular housing, a rectangular cover plate and a rectangular frame. The rectangular housing has therein a receptacle space for accommodating the circuit board. The rectangular cover plate covers the receptacle space of the housing. The rectangular frame is secured onto the cover plate for positioning the identification card onto the main body.

In an embodiment, the mobile communication peripheral device further comprises a supporting member having a recess structure for positioning the earphone therein.

In an embodiment, the microphone is disposed within the earphone supporting member.

In an embodiment, the earphone supporting member further comprises an audio transmission control key.

In an embodiment, the mobile communication peripheral device further comprises a power switch for controlling the power on and off states of the mobile communication peripheral device.

In an embodiment, the mobile communication peripheral device further comprises a power supply circuit for providing electricity required for the mobile communication peripheral device. Preferably, the power supply circuit comprises a rechargeable battery, a charging circuit, a DC-to-DC voltage regulator and a charging socket.

In an embodiment, the mobile communication peripheral device further comprises an indicator for indicating the operating states of the mobile communication peripheral device. Preferably, the states comprise a power-on state, a wireless signal searching state, a wireless communication on-line state, a communication termination state, a power-off state and a power deficient state.

In an embodiment, the mobile communication peripheral device further comprises a vibrator for vibrating the main body when the mobile communication peripheral device receives the first audio signal.

In an embodiment, the mobile communication peripheral device further comprises two volume control keys for adjusting the volume level of the earphone.

In an embodiment, the mobile communication peripheral device further comprises a sound recording module for storing therein the first audio signal and the second audio signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
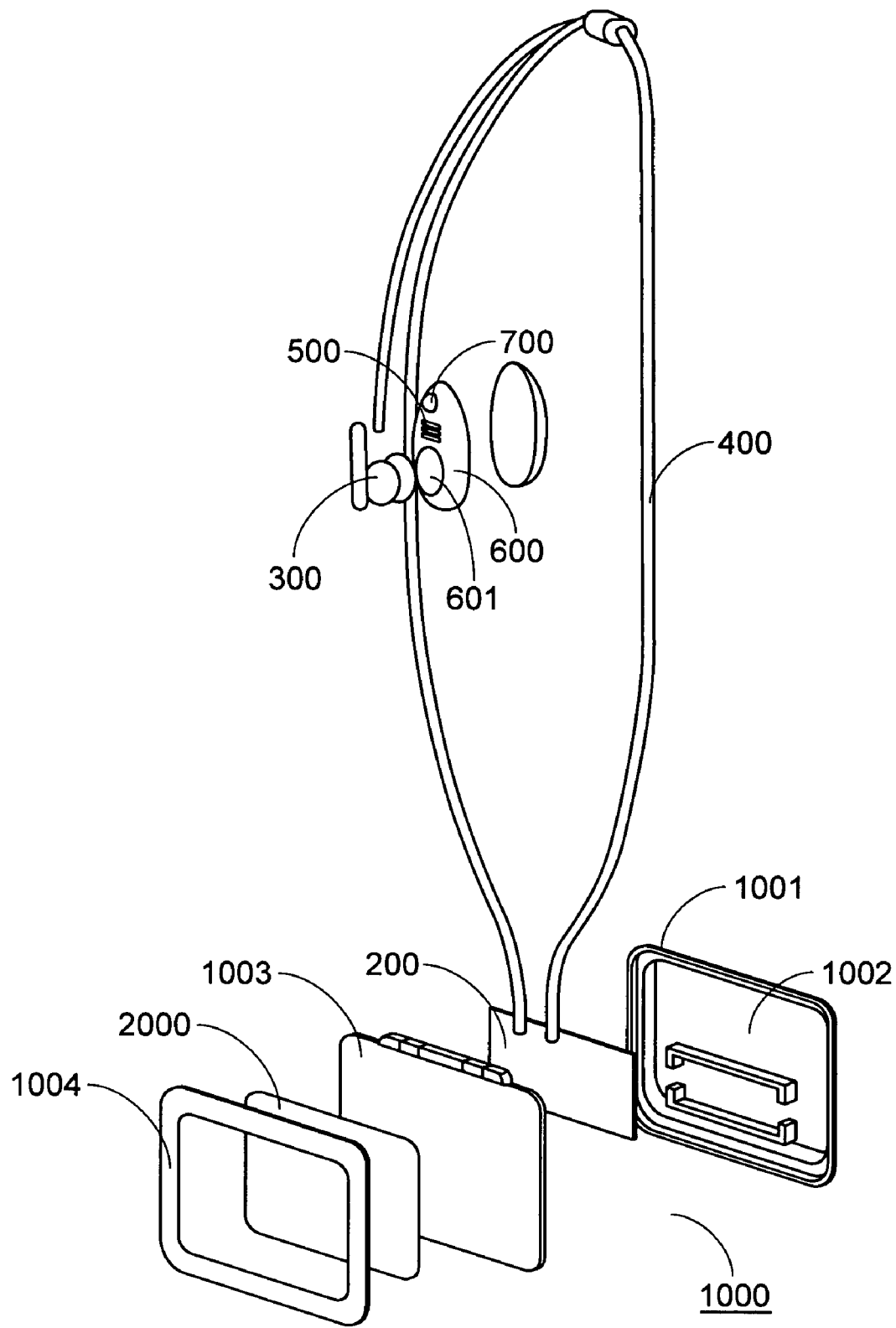
FIG. 1 is a schematic exploded diagram of a mobile communication peripheral device according to a preferred embodiment of the present invention.

Referring to FIG. 1, a schematic exploded diagram of a mobile communication peripheral device according to a preferred embodiment of the present invention is shown.

The mobile communication peripheral device of FIG. 1 comprises a main body 1000, a circuit board 200, an earphone 300 and a microphone 500. The circuit board 200 is disposed within the main body 1000, and has thereon the circuitry (not shown) required for the mobile communication peripheral device. The earphone 300 is coupled to the main body 1000 via a connecting wire 400. The microphone 500 is also coupled to the main body 1000 via the connecting wire 400.

The main body 1000 comprises a rectangular housing 1001 having therein a receptacle space 1002 for accommodating the circuit board 200, and a rectangular cover plate 1003 for covering the receptacle space 1002 of the housing 1001. An identification card 2000 can be placed on a surface of the cover plate 1003. A rectangular frame 1004 can be secured onto the cover plate 1003 so as to position the identification card 2000. It is noted that, however, those skilled in the art will readily observe that numerous modifications and alterations of the connection member may be made while retaining the teachings of the invention. For example, the housing 1001 may have an arbitrary shape such as an elliptic or circular shape. Accordingly, the above disclosure should be limited only by the bounds of the following claims.

The mobile communication peripheral device of FIG. 1 further comprises an earphone supporting member 600. The supporting member 600 has a recess structure 601 for positioning the earphone 300 therein. The microphone 500 is disposed within the earphone supporting member 600. An audio transmission control key 700 is further arranged on the earphone supporting member 600.

Figure 2:
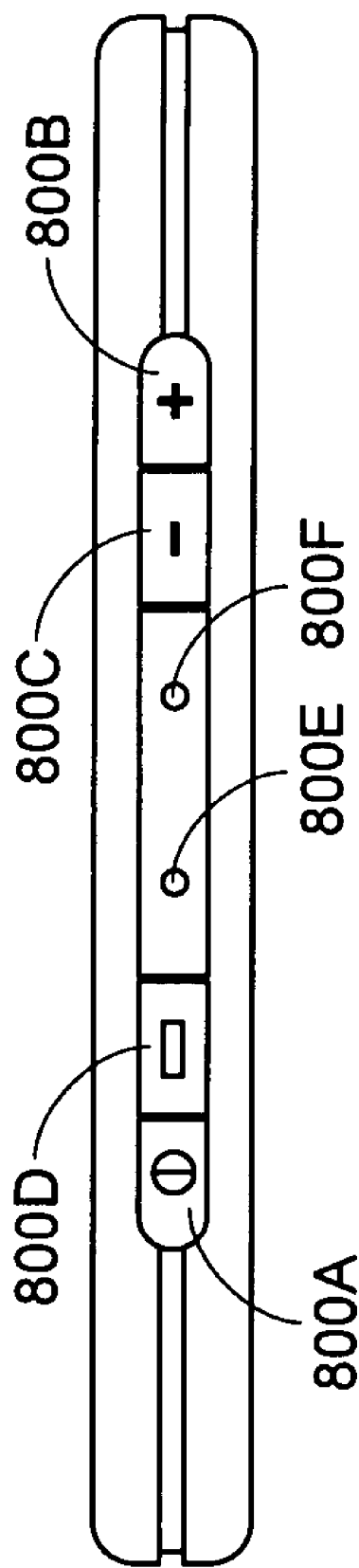
FIG. 2 is a side view of the mobile communication peripheral device in FIG. 1 after assembled.

Please refer to FIG. 2, which illustrates a side view of the mobile communication peripheral device of FIG. 1 after assembled. In FIG. 2, a power switch 800A, a volume up control key 800B, a volume down control key 800C, an indicator 800D, and wire perforations 800E and 800F of the mobile communication peripheral device are shown.

Figure 3:
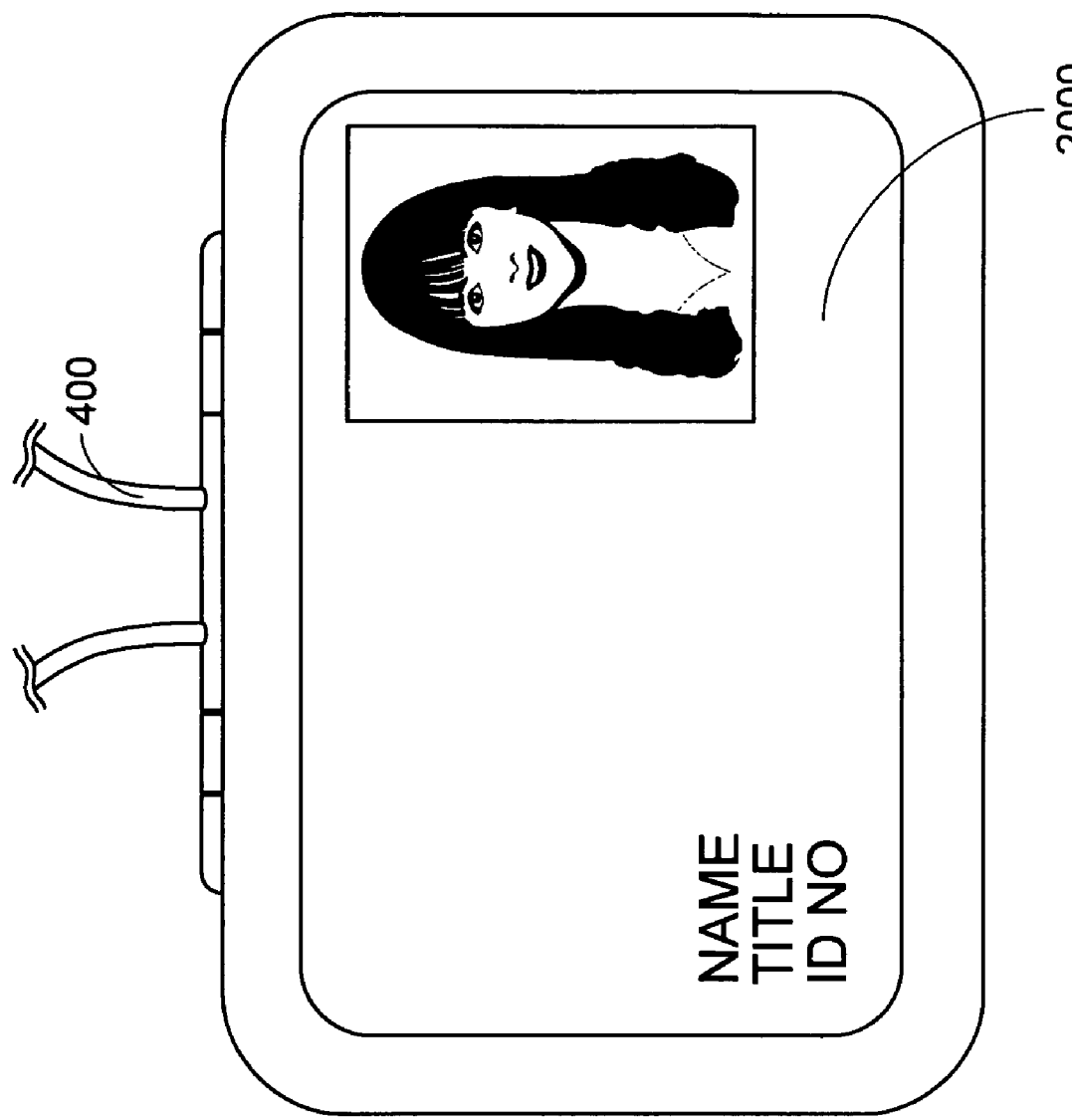
FIG. 3 is a front view of the mobile communication peripheral device in FIG. 1 after assembled.

Please refer to FIG. 3, which illustrates a front view of the mobile communication peripheral device of FIG. 1 after assembled. As shown in FIG. 3, the identification card 2000 which shows an user's photo and name and job title is included in the mobile communication peripheral device.

Figure 4:
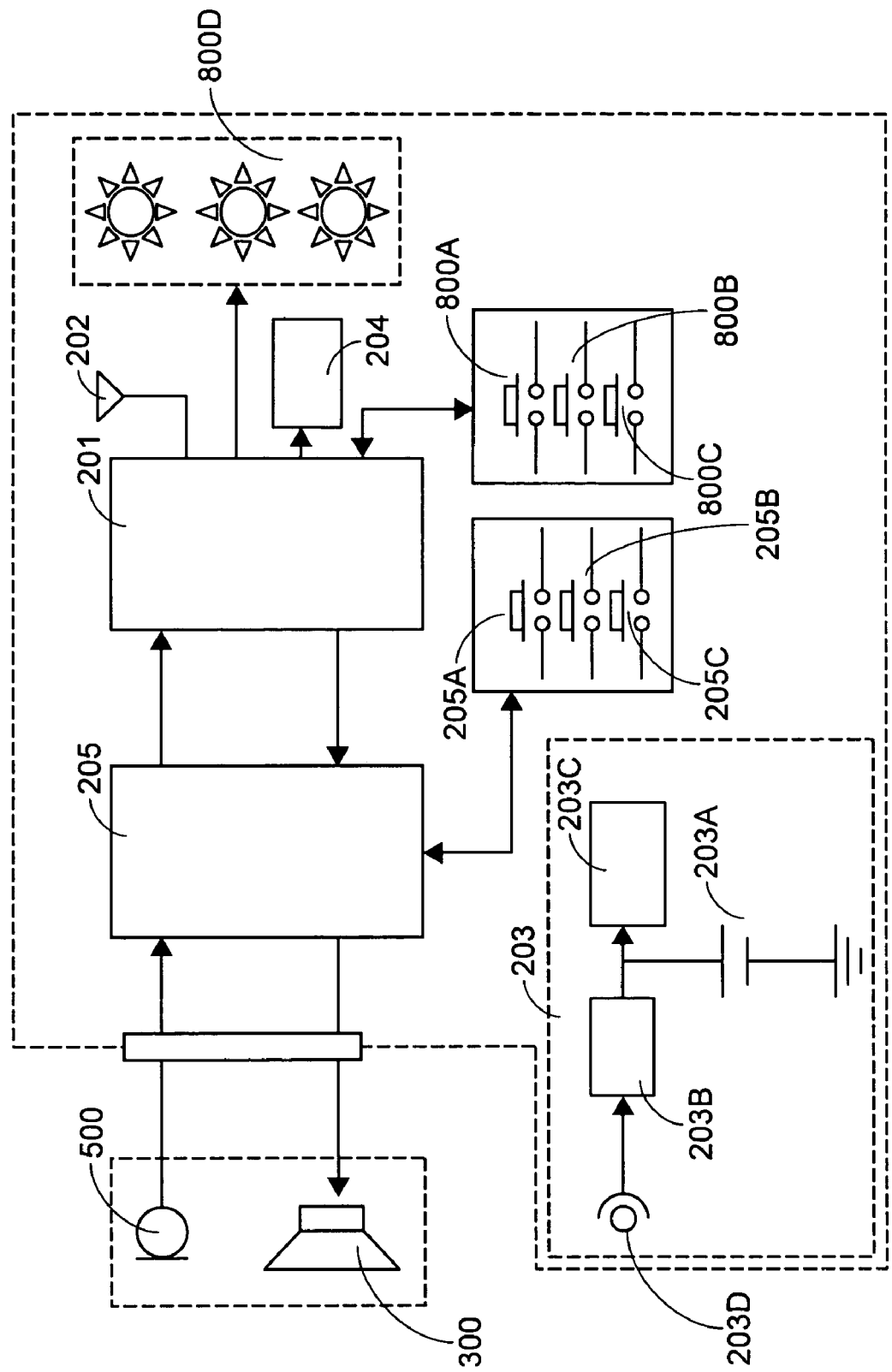
FIG. 4 is a circuit block diagram illustrating the configuration of the mobile communication peripheral device in FIG. 1.

Referring to FIG. 4, a circuit block diagram illustrating the configuration of the mobile communication peripheral device of the present invention is shown. The circuitry of FIG. 4 comprises a signal processing device 201, a transceiver 202, a power supply circuit 203 and a vibrator 204. The signal processing device 201 is for example a bluetooth signal processing module or other wireless communication signal processing module. The power supply circuit 203 comprises a rechargeable battery 203A, a charging circuit 203B, a DC-to-DC voltage regulator 203C and a charging socket 203D.

Preferably, the mobile communication peripheral device of the present invention further comprises a sound recording chip 205, a recording playback key 205A, a recording key 205B and an erasing key 205C.

The method of using the mobile communication peripheral device of the present invention will be described as follows in more details.

During operation, as an identification card for office use is worn, the mobile communication peripheral device is utilized by wearing the connecting wire 400 on the neck thereof. In a case that somebody dial the number of the user's mobile phone, the transceiver 202 may receive the external wireless communication signal from the user's mobile phone and the received signal is transmitted to the signal processing device 201. The wireless communication signal comprises a first audio signal such as the ring tone and the caller's voice. The vibrator 204 is controlled by the signal processing device 201 to generate vibration such that the main body vibrates to notify the incoming call. After the earphone 300 is worn on the ear and the audio transmission control key 700 is pressed down, the communication between the user and the caller begins. During communication, audio of the external call is transmitted to the ear of the user via the earphone 300, and the user can input a second audio signal via the microphone 500. The second audio signal is the replying content of the user. The replying content is processed by the signal processing device 201, transmitted to the user's mobile phone via the transceiver 202, and transmitted to the caller through the user's mobile phone so as to make communication. During communication, the user can control the volume levels by adjusting the volume up control key 800B and the volume down control key 800C.

If the user intends to record the dialogic contents, by pressing the recording key 205B, the user can begin the recording operation. In addition, the recorded contents can be played when the playback key 205A is pressed, and erased when the erasing key 205C is pressed.

The mobile communication peripheral device can use the rechargeable battery 203A to provide electricity. In a case that the power of the rechargeable battery 203A is exhausted, the rechargeable battery 203A can be charged from an external charger (not shown) which is electrically connected to the charging circuit 203B via the charging socket 203D. It is preferred that the external charger may be the charger for use with the user's mobile phone.

The indicator 800D is employed to indicate the operating states of the mobile communication peripheral device. The states of the mobile communication peripheral device indicated by the indicator 800D include for example: (1) a power-on state, (2) a wireless signal searching state (pairing state), (3) a wireless communication on-line state, (4) a communication termination state, (5) a power-off state, and (6) a power deficient state.

The power-on state is entered when the power switch 800A is pressed. In the power-on state, the indicator 800D twinkles green light for 1 second, and the mobile communication peripheral device emits for example a toot sound to notify the power is turned on.

In the wireless signal searching state, the indicator 800D continuously twinkles green light for about 10 seconds, indicating that the mobile communication peripheral device is searching for a compatible wireless communication device. In this embodiment, the compatible wireless communication device is the user's mobile phone. If the mobile communication peripheral device fails to search for the compatible wireless communication device during this time period, the mobile communication peripheral device may be automatically powered off.

In the wireless communication on-line state, the indicator 800D twinkles a blue light every 5 seconds, indicating that the mobile communication peripheral device is linked to the wireless communication device.

In the communication termination state, the indicator 800D twinkles red light for 1 second, indicating that the communication is terminated.

In the power-off state, the indicator 800D twinkles red light for a second, and the mobile communication peripheral device emits a toot sound to notify the power is turned off.

In the power deficient state, the indicator 800D twinkles a red light every 5 seconds, indicating that the power of the battery is deficient.

As know, most wageworkers wear badges when they are on duty. Since the mobile communication peripheral device of the present invention provides the functions of badge and wireless earphone, the convenience of the wireless earphone is imparted thereon but the drawbacks resulted from the wireless earphone are exempted.

In views of the common usage, a conventional badge is hung on a wageworker's neck with a cord when the wageworker is on duty. Since the badge cord can be replaced with a connecting wire and the circuitry for processing wireless communication signals is integrated into the mobile communication peripheral device of the present invention, the user needs not carry any additional accessory to answer calls. Moreover, by using the mobile communication peripheral device of the present invention, the user can receive the wireless communication signals with a wired earphone, but no connecting wire between the mobile phone and the earphone is required. More specially, the user need not wear a weighty and cumbersome wireless earphone device for an extended time period.

It is noted that, however, those skilled in the art will readily observe that numerous modifications and alterations of the connection member may be made while retaining the teachings of the invention. For example, in addition to the bluetooth protocol, other wireless communication protocols are feasible. Further, the twinkling intervals and colors associated with the states of the indicators may be varied. Accordingly, the above disclosure should be limited only by the bounds of the following claims.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mobile communication peripheral device comprising:
   a main body, wherein an identification card is disposed on a surface of said main body;
   a circuit board disposed within said main body, and comprising a transceiver for receiving and emitting a wireless communication signal and a signal processing device electrically connected to said transceiver for processing said wireless communication signal, wherein said wireless communication signal includes a first audio signal;
   an earphone coupled to said main body via a connecting wire for receiving and sending out said first audio signal;
   a microphone coupled to said main body via said connecting wire for receiving a second audio signal;
   a supporting member having a recess structure for positioning said earphone therein, said microphone is disposed within said supporting member, said supporting member further comprises an audio transmission control key;
   a power switch for controlling the power on and off states of said mobile communication peripheral device;
   a power supply circuit for providing electricity required for said mobile communication peripheral device, wherein said power supply circuit comprises a rechargeable battery, a charging circuit, a DC-to-DC voltage regulator and a charging socket; and
   an indicator for indicating the operating states of said mobile communication peripheral device, wherein said states comprise a power-on state, a wireless signal searching state, a wireless communication on-line state, a communication termination state, a power-off state and a power deficient state.

2. The mobile communication peripheral device according to claim 1, wherein said main body comprises: a rectangular housing having therein a receptacle space for accommodating said circuit board; a rectangular cover plate covering said receptacle space of said housing; and a rectangular frame secured onto said cover plate for positioning the identification card onto said main body.

3. The mobile communication peripheral device according to claim 1, further comprising a vibrator for vibrating said main body when said mobile communication peripheral device receives said first audio signal.

4. The mobile communication peripheral device according to claim 1, further comprising two volume control keys for adjusting the volume level of said earphone.

5. The mobile communication peripheral device according to claim 1, further comprising a sound recording module for storing therein said first audio signal and said second audio signal.

* * * * *